(12) United States Patent
An

(10) Patent No.: US 8,461,969 B2
(45) Date of Patent: Jun. 11, 2013

(54) DUAL MODE VIBRATOR

(75) Inventor: Sunghwan An, Gyeonggi-do (KR)

(73) Assignee: LG Innotek Co., Ltd., Seoul (KR)

( * ) Notice: Subject to any disclaimer, the term of this patent is extended or adjusted under 35 U.S.C. 154(b) by 459 days.

(21) Appl. No.: 12/792,425

(22) Filed: Jun. 2, 2010

(65) Prior Publication Data

US 2010/0302752 A1    Dec. 2, 2010

(30) Foreign Application Priority Data

Jun. 2, 2009  (KR) .................. 10-2009-0048573
Jun. 2, 2009  (KR) .................. 10-2009-0048576

(51) Int. Cl.
    *H04B 3/36*    (2006.01)
(52) U.S. Cl.
    USPC ............ 340/407.1; 340/815.62; 340/390.1; 340/392.2; 340/404.2; 333/189; 333/239; 310/320; 310/323.02; 310/344; 318/128; 318/129; 318/132; 318/615
(58) Field of Classification Search
    USPC ............. 340/407.1, 815.62, 390.1, 392.2, 340/404.2; 333/189, 239; 310/320, 323.02, 310/344; 318/128, 129, 132, 611, 615
    See application file for complete search history.

(56) References Cited

U.S. PATENT DOCUMENTS

| | | | | |
|---|---|---|---|---|
| 1,005,855 A | * | 10/1911 | Lindquist | 335/244 |
| 1,637,442 A | * | 8/1927 | Dorsey | 333/200 |
| 2,187,717 A | * | 1/1940 | Weyandt | 198/769 |
| 2,299,425 A | * | 10/1942 | Peters | 73/672 |
| 2,690,646 A | * | 10/1954 | Clifford | 368/126 |
| 2,793,293 A | * | 5/1957 | Ehrlinger et al. | 310/25 |
| 2,816,514 A | * | 12/1957 | Freese | 417/412 |
| 2,845,697 A | * | 8/1958 | Adler | 29/896.2 |
| 3,024,429 A | * | 3/1962 | Cavalieri, Jr. et al. | 333/200 |
| 3,134,035 A | * | 5/1964 | Grib | 310/25 |
| 3,149,274 A | * | 9/1964 | Hetzel | 318/128 |
| 3,207,965 A | * | 9/1965 | Lavet | 318/128 |
| 3,263,105 A | * | 7/1966 | Heyek | 310/25 |
| 3,268,786 A | * | 8/1966 | Reich | 318/128 |
| 3,308,361 A | * | 3/1967 | Nakai et al. | 318/128 |
| 3,310,757 A | * | 3/1967 | Dostal | 331/116 M |

(Continued)

FOREIGN PATENT DOCUMENTS

| | | | | |
|---|---|---|---|---|
| JP | 53033030 A | * | 3/1978 | |
| JP | 02098207 A | * | 4/1990 | |

(Continued)

*Primary Examiner* — George Bugg
*Assistant Examiner* — Paul Obiniyi
(74) *Attorney, Agent, or Firm* — Saliwanchik, Lloyd & Eisenschenk

(57) ABSTRACT

A dual mode vibrator is disclosed. There are available two vibrating units to enable obtainment of a variety of vibrations. Each lateral portion of the first and second vibrating units respectively supported by the first and second elastic members is supported by the first and second support bars secured at the housing for rotatable installation. Therefore, although the first and second vibrating units may rotate about the first and second support bars, the first and second vibrating units are not allowed to deviated or disengaged from the first and second support bars, whereby the plastic deformation of the first and second elastic members is prevented, and the first and second vibrating units can be positioned at predetermined positions at all times to enhance reliability of product. Furthermore, each lateral portion of the first and second vibrating units is respectively supported by the first and second elastic members while the other lateral portions of the first and second vibrating units are restrained by a stopper at a predetermined distance or more.

10 Claims, 6 Drawing Sheets

U.S. PATENT DOCUMENTS

| | | | | |
|---|---|---|---|---|
| 3,360,704 A * | 12/1967 | Kohlhagen | | 318/128 |
| 3,425,310 A * | 2/1969 | Grib et al. | | 84/457 |
| 3,448,304 A * | 6/1969 | Fritz | | 310/15 |
| 3,480,809 A * | 11/1969 | Grib | | 310/25 |
| 3,591,814 A * | 7/1971 | Clifford | | 310/85 |
| 3,597,642 A * | 8/1971 | Kurino | | 310/322 |
| 3,672,153 A * | 6/1972 | Mutter | | 368/125 |
| 3,683,613 A * | 8/1972 | Baumgartner et al. | | 368/80 |
| 3,760,482 A * | 9/1973 | Kawamura | | 29/896.22 |
| 3,840,789 A * | 10/1974 | Dion | | 318/128 |
| 3,909,639 A * | 9/1975 | Kawai et al. | | 310/344 |
| 3,909,640 A * | 9/1975 | Kawai | | 310/344 |
| 4,023,055 A * | 5/1977 | Tsukada | | 310/370 |
| 4,037,121 A * | 7/1977 | Nakamura et al. | | 310/321 |
| 4,340,835 A * | 7/1982 | Nakamura et al. | | 310/321 |
| 4,370,584 A * | 1/1983 | Ikeno et al. | | 310/365 |
| 4,384,829 A * | 5/1983 | Conley et al. | | 417/412 |
| 4,433,264 A * | 2/1984 | Nishiyama et al. | | 310/321 |
| 4,450,928 A * | 5/1984 | Weber et al. | | 181/121 |
| 4,457,673 A * | 7/1984 | Conley et al. | | 417/412 |
| 4,488,099 A * | 12/1984 | LaForge et al. | | 318/561 |
| 4,519,043 A * | 5/1985 | La Forge et al. | | 702/105 |
| 4,565,497 A * | 1/1986 | Miller et al. | | 417/63 |
| 4,632,215 A * | 12/1986 | Farris | | 181/114 |
| 4,649,310 A * | 3/1987 | Nakamura et al. | | 310/321 |
| 4,848,525 A * | 7/1989 | Jacot et al. | | 188/378 |
| 4,894,577 A * | 1/1990 | Okamoto et al. | | 310/320 |
| 5,073,739 A * | 12/1991 | Iijima et al. | | 310/323.02 |
| 5,078,834 A * | 1/1992 | Witte | | 216/18 |
| 5,105,117 A * | 4/1992 | Yamaguchi | | 310/323.16 |
| 5,130,599 A * | 7/1992 | Toda | | 310/323.02 |
| 5,233,258 A * | 8/1993 | Myoga et al. | | 310/323.17 |
| 5,484,764 A * | 1/1996 | Fiediuszko et al. | | 505/210 |
| 5,524,061 A * | 6/1996 | Mooney et al. | | 381/151 |
| 5,889,449 A * | 3/1999 | Fiedziuszko | | 333/239 |
| 6,081,063 A * | 6/2000 | Kasuga et al. | | 310/323.02 |
| 6,211,603 B1* | 4/2001 | Iino et al. | | 310/323.02 |
| 6,281,769 B1* | 8/2001 | Fiedziuszko | | 333/239 |
| 6,323,581 B1* | 11/2001 | Powell | | 310/328 |
| 6,396,194 B1* | 5/2002 | Iino et al. | | 310/323.16 |
| 6,445,149 B1* | 9/2002 | Muramatsu et al. | | 318/114 |
| 6,464,213 B1* | 10/2002 | Kojima | | 267/140.14 |
| 6,621,194 B1* | 9/2003 | Sugimoto et al. | | 310/368 |
| 6,731,187 B2* | 5/2004 | Kurihara et al. | | 333/189 |
| 6,922,305 B2* | 7/2005 | Price | | 360/78.12 |
| 7,141,912 B2* | 11/2006 | Ikeda et al. | | 310/321 |
| 7,518,275 B2* | 4/2009 | Suzuki et al. | | 310/81 |
| 7,719,786 B1* | 5/2010 | Baumgart et al. | | 360/75 |
| 8,090,402 B1* | 1/2012 | Fujisaki | | 455/556.1 |
| 2002/0036445 A1* | 3/2002 | Iino et al. | | 310/323.16 |
| 2002/0149446 A1* | 10/2002 | Kurihara et al. | | 333/202 |
| 2007/0085495 A1* | 4/2007 | Suzuki et al. | | 318/128 |

FOREIGN PATENT DOCUMENTS

| | | | |
|---|---|---|---|
| JP | 02119406 A | * | 5/1990 |
| JP | 02140008 A | * | 5/1990 |
| JP | 07170148 A | * | 7/1995 |
| JP | 07231237 A | * | 8/1995 |
| JP | 2002033641 A | * | 1/2002 |
| JP | 2006349777 A | * | 12/2006 |
| JP | 2007327894 A | * | 12/2007 |

* cited by examiner

DUAL MODE VIBRATOR

CROSS-REFERENCE TO RELATED APPLICATIONS

This application claims the benefit under 35 U.S.C. §119 of Korean Patent Application Nos. 10-2009-0048573,filed on Jun. 2, 2009, and 10-2009-0048576, filed on Jun. 2, 2009, which are hereby incorporated by reference in their entirety.

BACKGROUND OF THE INVENTION

1. Field of the Invention

The present disclosure relates to a dual mode vibrator.

2. Description of Related Art

Generally, mobile terminals are embedded with a signal generating device such as a sound generating device or a vibration generating device announcing arrival of an arrival signal.

The conventional vibration generating device is formed with only one vibrating unit for generating the vibration, such that a vibration signal is monotonous.

A dual mode vibrator provided with two vibrating units has been developed in order to obtain various types of vibrations and differentiated vibration signals.

The dual mode vibrator is configured in such a manner that a current is applied to a coil in the form of a frequency, the coil and the two vibrating units are selectively operated responsive to frequency band of the current applied to the coil, and the two vibrating units are selectively vibrated.

Even in the course of the coil and one of the two vibrating units being operated, the other vibrating unit is vibrated, and vice versa. The vibrating units are supported by a spring and vibrated.

In the conventional dual mode vibrator, the vibrating units are supported only by the spring, such that the vibrating units may deviate from a predetermined position at a predetermined distance or more by shock and other outside factors, whereby the spring is plastic-deformed by the vibrating units, resulting in the vibrating units deviating from the predetermined position. In that case, frequency change in the current or reduction in vibration may be incurred to decrease reliability of the product.

BRIEF SUMMARY

The present disclosure has been made to solve the foregoing problems of the prior art and therefore an object of certain embodiments of the present invention is to provide a dual mode vibrator configured to provide a variety of vibrations and to enhance reliability of the product.

In one general aspect of the present disclosure, there is provided a dual mode vibrator, comprising: a housing; a coil secured at an interior of the housing; a first vibrating unit formed in the vicinity of the coil to vibrate in association with the coil if a current of a first frequency band is applied to the coil; a second vibrating unit formed in the vicinity of the coil and arranged opposite to the first vibrating unit to vibrate in association with the coil if a current of a second frequency band is applied to the coil; a first elastic member secured at the housing to support one side of the first vibrating unit; a second elastic member secured at the housing to support one side of the second vibrating unit; and deformation prevention means provided at the housing between the other side of the first vibrating unit and the one side of the first and second vibrating units to prevent the first and second elastic members from being plastic-deformed.

In another general aspect of the present disclosure, there is provided a dual mode vibrator, comprising: a housing; a coil secured at an interior of the housing; a first vibrating unit formed in the vicinity of the coil to vibrate in association with the coil if a current of a first frequency band is applied to the coil; a second vibrating unit formed in the vicinity of the coil and arranged opposite to the first vibrating unit to vibrate in association with the coil if a current of a second frequency band is applied to the coil; a first elastic member secured at the housing to support one side of the first vibrating unit; a second elastic member secured at the housing to support one side of the second vibrating unit; and deformation prevention means provided at the housing between the other side of the first vibrating unit and the other side of the second vibrating units to restrain the other sides of the first and second vibrating units from moving at a predetermined distance or more and to prevent the first and second elastic members from being plastic-deformed.

The dual mode vibrator according to the present disclosure is advantageous in that there are available two vibrating units to enable obtainment of a variety of vibrations. Each lateral portion of the first and second vibrating units respectively supported by the first and second elastic members is supported by the first and second support bars secured at the housing for rotatable installation.

Therefore, although the first and second vibrating units may rotate about the first and second support bars, the first and second vibrating units are not allowed to deviated or disengaged from the first and second support bars, whereby the plastic deformation of the first and second elastic members is prevented, and the first and second vibrating units can be positioned at predetermined positions at all times to enhance reliability of product.

Furthermore, the dual mode vibrator according to the present disclosure is configured in such a manner that each lateral portion of the first and second vibrating units is respectively supported by the first and second elastic members while the other lateral portions of the first and second vibrating units are restrained by a stopper at a predetermined distance or more.

Therefore, because the first and second vibrating units cannot move at a predetermined distance or more, the plastic deformation of the first and second elastic members respectively supporting the first and second vibrating units is prevented, whereby the first and second vibrating units can be positioned at predetermined positions at all times to enhance reliability of product.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

A dual mode vibrator according to exemplary embodiments of the present disclosure will be described in detail with reference to the accompanying drawings.

The suffixes 'module', 'unit', 'portion' and 'part' may be used for elements in order to facilitate the disclosure. Significant meanings or roles may not be given to the suffixes themselves and it is understood that the 'module', 'unit', 'portion' and 'part' may be used together or interchangeably.

Figure 1:
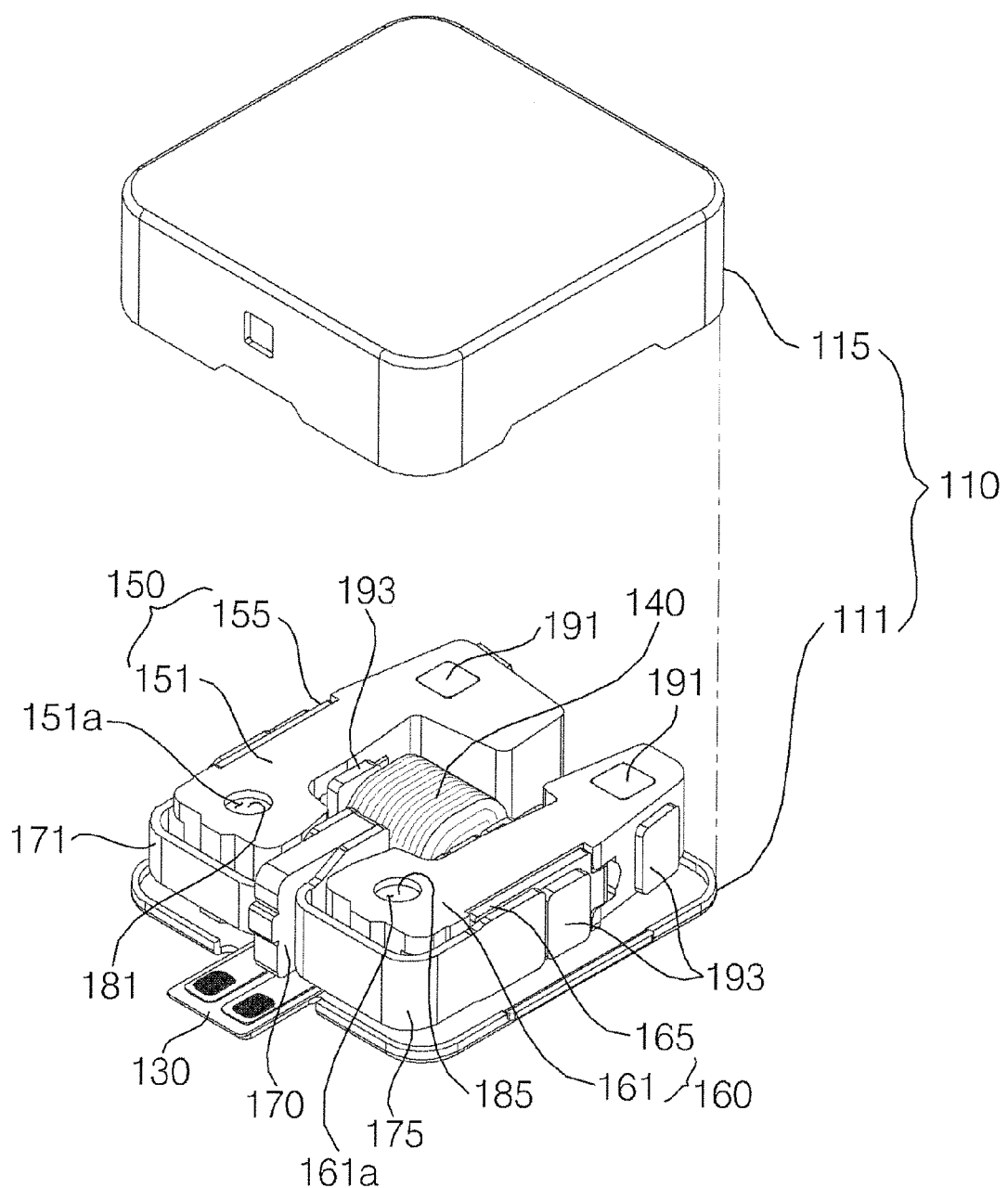
FIG. 1 is a perspective view of a dual mode vibrator according to an exemplary embodiment of the present disclosure.
Figure 2:
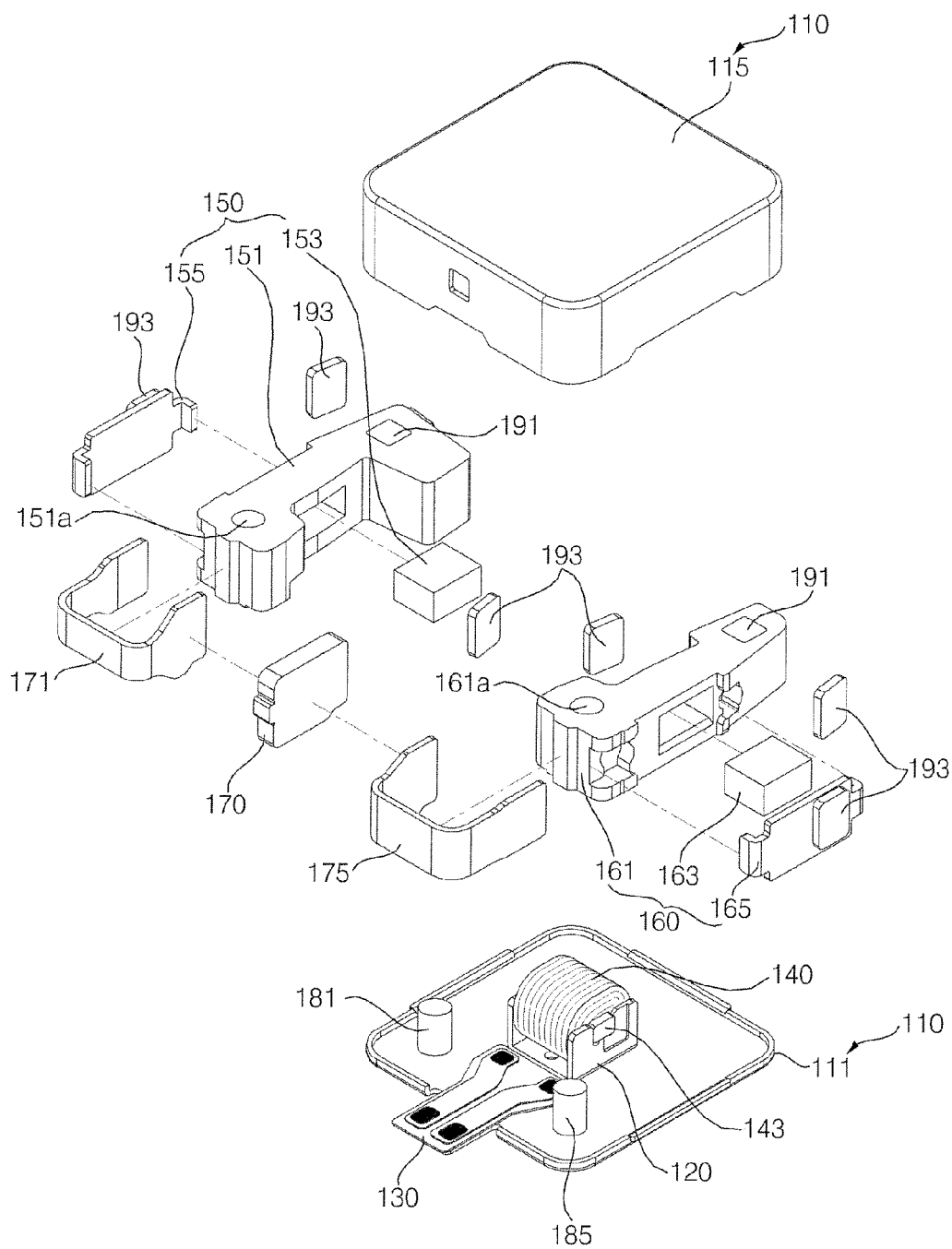
FIG. 2 is an exploded perspective view of a dual mode vibrator according to an exemplary embodiment of the present disclosure.
Figure 3:
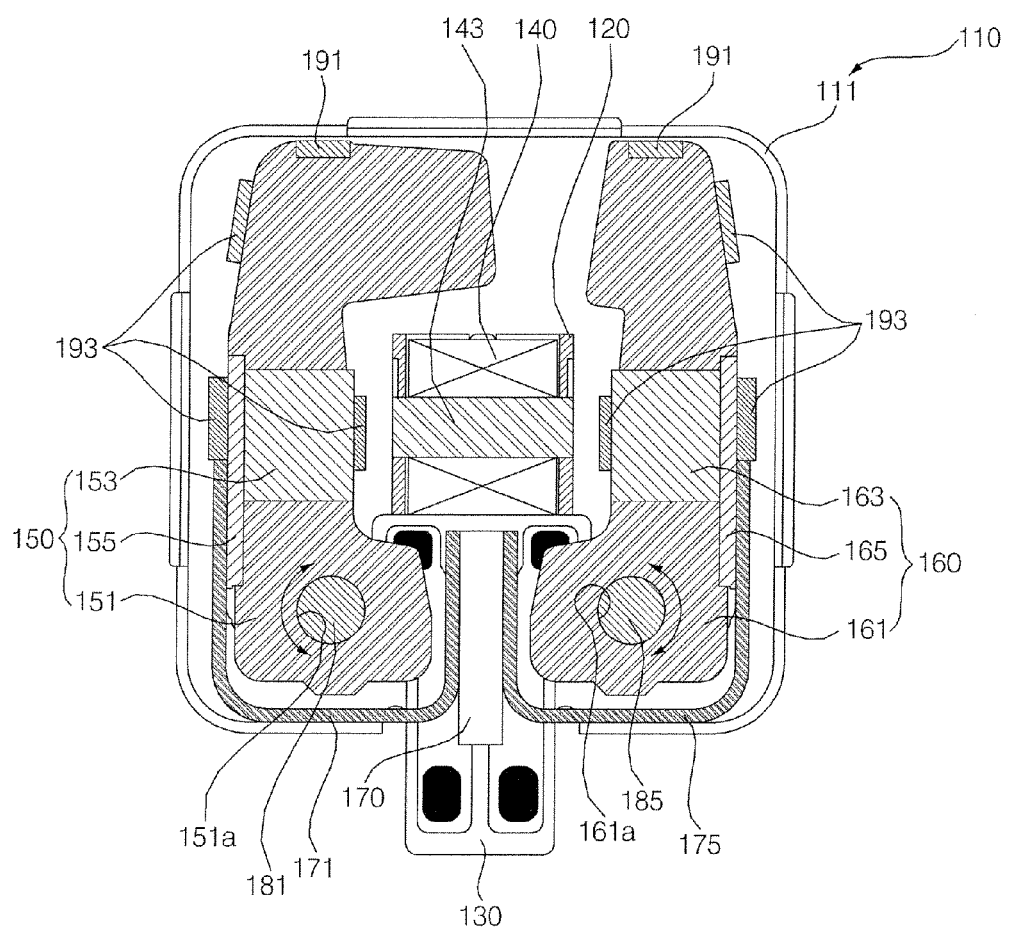
FIG. 3 is a plain cross-sectional view in which a case of a dual mode vibrator is removed according to an exemplary embodiment of the present disclosure.

FIG. 1 is a perspective view of a dual mode vibrator according to an exemplary embodiment of the present disclosure, FIG. 2 is an exploded perspective view of a dual mode vibrator according to an exemplary embodiment of the present disclosure, and FIG. 3 is a plain cross-sectional view in which a case of a dual mode vibrator is removed according to an exemplary embodiment of the present disclosure.

As illustrated in the figures, the dual mode vibrator is installed at a product such as a mobile terminal, and is provided with a housing 110 having a hexagonal shape. The housing 110 is formed with a base 111 and a case 115, each mutually coupled together.

Hereinafter, in the description of directions and surfaces of constituent elements including the housing 110, a surface and a direction facing a vertical upper side of the base 111 are referred to as 'upper surface and upper side' and a surface and a direction facing a lower side of the base 111 are referred to as 'lower surface and lower side'.

The base 111 is centrally formed with a holder 120, and the base at the outer side of the holder 120 is installed with a PCB (Printed Circuit Board 130). The holder 120 is supportively installed therein with a coil 140, and the coil 140 is connected to the PCB 130. An outside power source is transmitted to the coil 140 through the PCB 130, where the coil 140 is applied with a current in the form of frequency.

The coil 140 is arranged thereoutside with vibrating unit that vibrate in association with the coil 140. At this time, the vibrating unit is fanned with a first vibrating unit 150 and a second vibrating unit 160, facing each other across the coil 140.

The first vibrating unit 150 is formed with a first weight 151 disposed at one side of the coil 140, a first magnet 153 formed inside the weight 151 to vibrate in association with the coil 140 and to vibrate the first weight 151, and a first yoke 155 coupled to a lateral surface of the first weight 151 to form a magnetic path of magnetic flux generated from the first magnet 153.

The second vibrating unit 160 includes a second weight 161 formed at the other lateral surface, the second weight 161 being smaller than the first weight 151, and facing the first weight 151 across the coil 140, a second magnet 163 coupled inside the second weight 161 and vibrating the second weight 161 in association with the coil 140, and a second yoke 165 coupled to a lateral surface of the second weight 161 to form a magnetic path of magnetic flux generated by a second magnet 163.

A support bracket 170 is coupled at an upper surface of the case 115 facing the PCB 130 or at a portion of the base 111 where the PCB 130 is formed. The support bracket 170 is formed at one lateral surface and the other lateral surface thereof with first and second elastic members 171, 175 such as a spring.

Each of the first and second elastic members 171, 175 is substantially U-shaped, to support the first and second vibrating units 150, 160.

To be more specific, one lateral surface of the first elastic member 171 is coupled with a lateral surface of the support bracket 170, a lateral surface of the first weight 151 is formed at an interior of the first elastic member 171 to be coupled to the other lateral surface of the first elastic member 171.

A lateral surface of the second elastic member 175 is coupled to the other lateral surface of the support bracket 170, and a lateral surface of the second elastic member 161 is coupled to an interior of the second elastic member 175 to be coupled to the other lateral surface of the second elastic member 175.

In a case a current in the form of a frequency is applied to the coil 140, and a current of a first frequency band which is a harmonic frequency in the range of 140~160 Hz is applied, the first magnet 153 is vibrated by the action of the coil 140 and the first magnet 153. Then, the first vibrating unit 150 including the first weight 151 is vibrated, and the vibration of the first vibrating unit 150 is transmitted to the housing 110 through the first elastic member 171, whereby the mobile terminal formed with the housing 110 is provided with a vibration signal.

Furthermore, in a case a current of a second frequency band which is a harmonic frequency in the range of 240~260 Hz is applied to the coil 140, the second magnet 163 is vibrated by the action of the coil 140 and the second magnet 163. The second vibrating unit 160 including the second weight 161 is vibrated, and the vibration of the second vibrating unit 160 is transmitted to the housing 110 through the second elastic member 175, whereby the mobile terminal formed with the housing 110 is provided with a vibration signal. The first and second vibrating units 150, 160 are vibrated alternatively across the coil 140 in parallel with the base 111.

However, because the current is continuously applied to the coil 140 in the form of frequency, the second vibrating unit 160 may vibrate while the coil 140 and the first magnet 153 are interacted, and the first vibrating unit 150 is vibrated while the coil 140 and the second magnet 163 are interacted. At this time, the second vibrating unit 160 vibrates lightly due to lighter weight than that of the first weight and having a high number of vibrations, such that harmony between the first and second vibrating units 150, 160 can generate a variety of differentiated vibration signals.

In a case the first and second vibrating units 150, 160 are disengaged from the interior of the housing 110 by shock or the like at a predetermined distance or more, a bent portion between first and second springs 171, 175 is plastic-deformed, whereby the first and second vibrating units 150, 160 are deviated from each installed position.

In the dual mode vibrator according to the first exemplary embodiment of the present disclosure, means is provided to prevent the first and second elastic members 171, 175 from being plastic-deformed, because each lateral portion of the first and second vibrating units 150, 160 supported to each of the first and second elastic members 171, 175 is supported.

The means is provided with a first support hole 151a formed at one lateral surface of the first weight 151 of the first vibrating unit 150, a first support bar 181 secured at the housing 110 by being inserted into the first support hole 151, and a second support bar 185 inserted into a second support hole 161a formed at a lateral surface of the second weight 161 of the second vibrating unit 160 and the second support hole 161a, and secured at the housing 110.

At this time, the first and second vibrating units 150, 160 are rotated to vibrate about the first and second support bars 181, 185 each at a predetermined angle. Then, each lateral surface of the first and second vibrating units 150, 160 each supported at the first and second elastic members 171, 175 is rotated about the first and second support bars 181, 185 each at a predetermined angle, and is prevented from deviating from the first and second support bars 181, 185, whereby the deformation of the first and second elastic members 171, 175 is avoided.

In a case the first and second vibrating units 150, 160 are rotated to vibrate about the first and second support bars 181, 185 each at a predetermined angle, the first and second elastic members 171, 175 are plastic-deformed. However, because an inner space of the housing 110 is cramped, each the other lateral surface or portion of the first and second vibrating units 150, 160 is restrained by the housing 110, whereby the first and second vibrating units 150, 160 are not allowed to rotate at a predetermined angle or more.

The first and second support bars 181, 185 may be integrally formed at an upper surface of the base 111 or the case 115, or separately formed to be fixed at the upper surface of the base 111 or the case 115.

Figure 4:
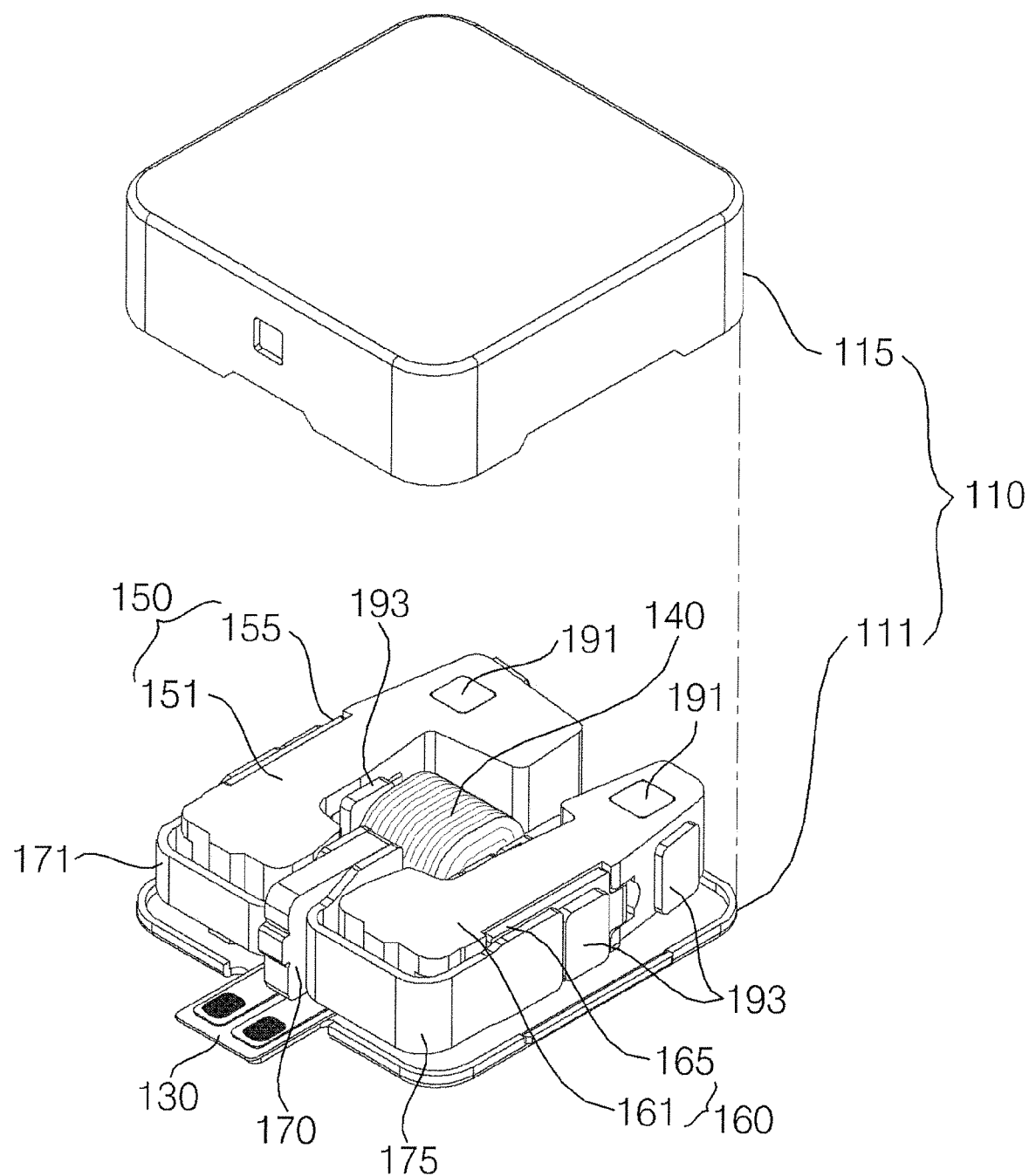
FIG. 4 is perspective view of a dual mode vibrator according to another exemplary embodiment of the present disclosure.
Figure 5:
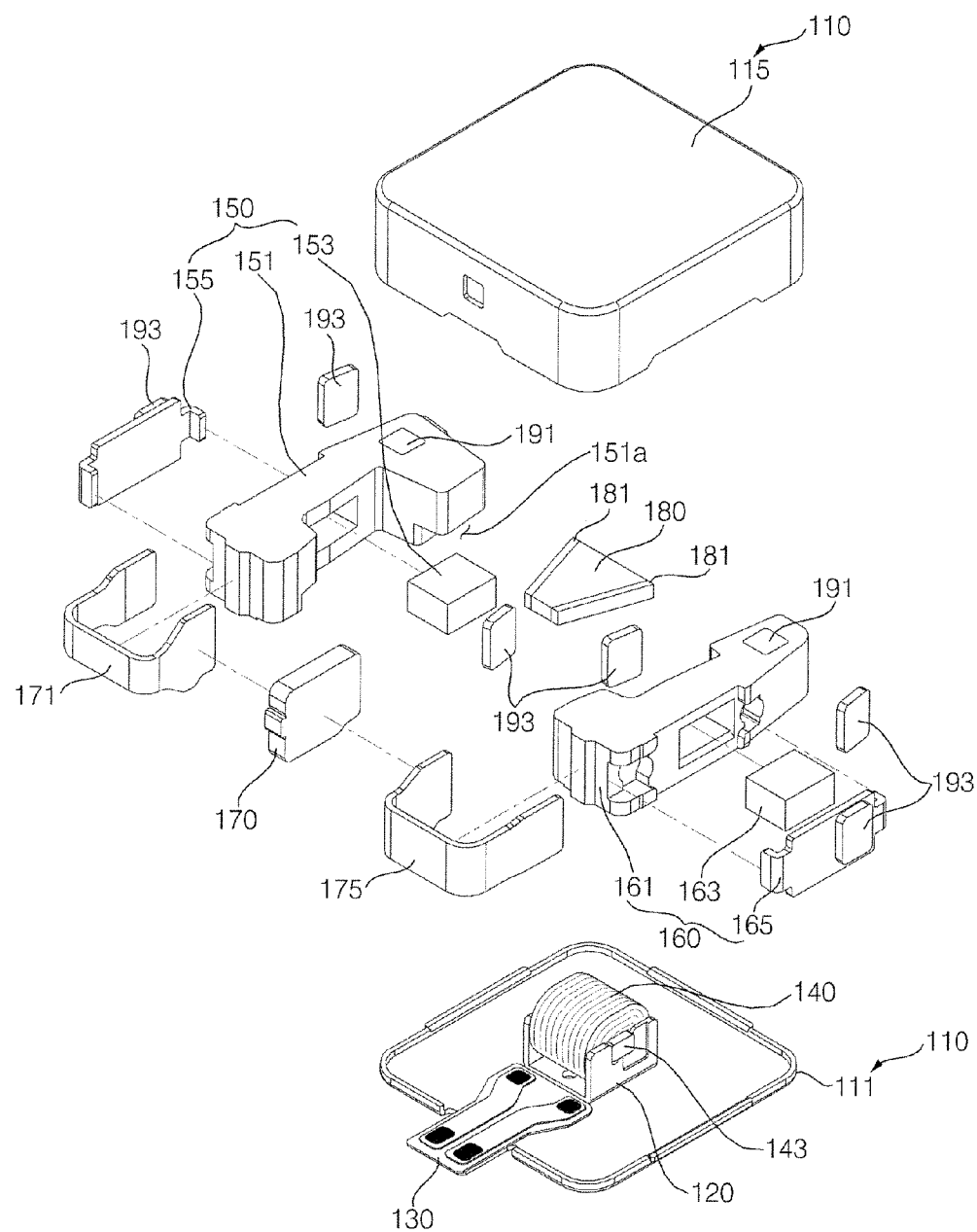
FIG. 5 is an exploded perspective view of a dual mode vibrator according to another exemplary embodiment of the present disclosure.
Figure 6:
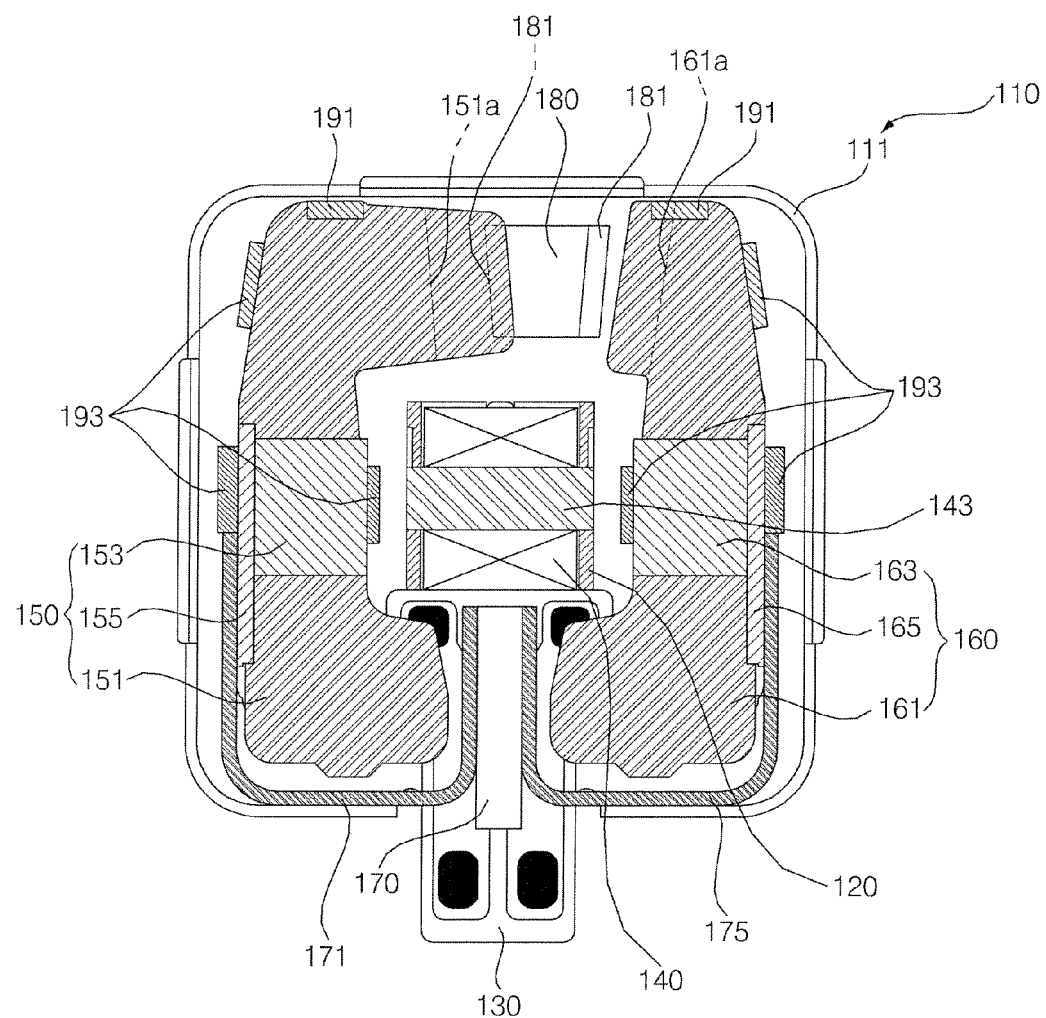
FIG. 6 is a plain cross-sectional view in which a case of a dual mode vibrator is removed according to another exemplary embodiment of the present disclosure.

Meanwhile, FIG. 4 is perspective view of a dual mode vibrator according to another exemplary embodiment of the present disclosure, FIG. 5 is an exploded perspective view of a dual mode vibrator according to another exemplary embodiment of the present disclosure, and FIG. 6 is a plain cross-sectional view in which a case of a dual mode vibrator is removed according to another exemplary embodiment of the present disclosure.

Another exemplary embodiment of the present disclosure is provided with means preventing the first and second elastic members 171, 175 from being plastic-deformed by preventing the other portion of the first weight 151 at the first vibrating unit 150 that is not supported at the first and second elastic members 171, 175, and the other portion of the second weight 161 at the second vibrating unit 160 from moving at a predetermined distance or more.

The means is a stopper 180 that is coupled to the base 111 of the housing 110 between the other portion of the first weight 151 and the other portion of the second weight 161.

In a case the first and second vibrating units 150, 160 are vibrated, the first and second vibrating units 150, 160 fail to hit the stopper 180. However, in a case the other portion of the first vibrating unit 150 is to move toward the second vibrating unit 160 in response to shock at a predetermined distance, the other portion of the first vibrating unit 150 is restrained from moving due to blocking by the stopper 180, and in a case the other portion of the second vibrating unit 160 is to move toward the first vibrating unit 150 in response to shock at a predetermined distance, the other portion of the second vibrating unit 160 is restrained from moving due to blocking by the stopper 180.

Therefore, deformation of the first and second elastic members 171, 175 each supporting the one lateral surface of the first and second vibrating units 150, 160 is prevented, because the other lateral surfaces of the first and second vibrating units 150, 160 are not allowed to move at a predetermined distance or more.

Portions of the first and second weights 151, 161 each facing the lateral surface and the other lateral surface of the stopper 180 are so formed as to be caved in toward inner sides of the first and second weights 151, 161.

The caved-in portions 151a, 161a are so formed as to prevent an installation space from being enlarged due to the stopper 180, and in a case the first and second vibrating units 150, 160 vibrate, the stopper 180 is inserted into the caved-in portions 151, 161a of the first and second weights 151, 161.

The stopper 180 that is hit by the first and second weights 151, 161 is provided with a cushioning material. Alternatively, a lateral surface and the other lateral surface of the stopper 180, each facing the other portions of the first and second weights 151, 161 are separately provided with a separate cushioning material 181.

An interior of the other portions of the first and second weights 151, 161 each distanced apart from the first and second springs 171, 175 is provided with an auxiliary magnet 191 that holds a small vibration of the first and second vibrating units 150, 160 such that the first and second vibrating units 150, 160 can be rapidly stopped in a case the first and second vibrating units 150, 160 are stopped.

Unexplained reference numeral 143 is a core, 193 is a cushioning member that prevents the first and second vibrating units 150, 160 from directly hitting external elements.

Although the present disclosure has been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A dual mode vibrator, comprising:
a housing;
a coil secured at an interior of the housing;
a first vibrating unit formed in the vicinity of the coil to initiate vibrations in response to a current of a first frequency band applied to the coil;
a second vibrating unit formed in the vicinity of the coil and arranged opposite to the first vibrating unit to vibrate in association with the coil if a current of a second frequency band is applied to the coil;
a first elastic member secured at the housing to support one side of the first vibrating unit;
a second elastic member secured at the housing to support one side of the second vibrating unit;
and deformation prevention means provided at the housing between the other side of the first vibrating unit and the one side of the first and second vibrating units to prevent the first and second elastic members from being plastic-deformed;
wherein each one side of the first and the second vibrating units is provided with a first support hole and a second support hole, and the deformation prevention means is inserted into the first and the second support holes to be secured at the housing,
wherein the first and second vibrating units vibrate and rotate about a first support bar and a second support bar each at a predetermined angle,
wherein the deformation prevention means is a stopper coupled to the housing to restrain the other portion of either the first vibrating unit or the second vibrating unit from moving at a predetermined distance or more, and
wherein the stopper is formed with a cushioning material.

2. The vibrator of claim 1, wherein the first and second support bars are integrally formed with the housing.

3. The vibrator of claim 1, wherein the first and second support bars are separately formed to be discretely formed at the housing.

4. The vibrator of claim 1, wherein the other portions of the first and second vibrating units each facing the stopper are caved in toward an inner side of the first and second vibrating units.

5. The vibrator of claim 4, wherein the stopper is caved into the caved-in portion of the first and second vibrating units if the first and second vibrating units vibrate.

6. The vibrator of claim 1, wherein one lateral surface and the other lateral surface of the stopper each facing the first and second vibrating units is coupled to cushioning material.

7. The vibrator of claim 1, wherein the first and second vibrating units comprise:
 first and second weights, each formed in a different size and facing the other about the coil, one lateral side of which being supported by the first and second elastic members;
 first and second magnets each coupled to the first and second weights and vibrating the first and second vibrating units while vibrating in association with the coil; and
 first and second yokes each coupled to the first and second weights.

8. The vibrator of claim 2, wherein the first and second vibrating units vibrate and rotate about the first and second support bars each at a predetermined angle.

9. The vibrator of claim 3, wherein the first and second vibrating units vibrate and rotate about the first and second support bars each at a predetermined angle.

10. The vibrator of claim 1, wherein the first and second vibrating units comprise:
 first and second weights, each formed in a different size and facing the other about the coil, one lateral side of which being supported by the first and second elastic members;
 first and second magnets each coupled to the first and second weights and vibrating the first and second vibrating units while vibrating in association with the coil; and
 first and second yokes each coupled to the first and second weights.

\* \* \* \* \*